United States Patent [19]

Benne et al.

[11] Patent Number: 5,731,995
[45] Date of Patent: Mar. 24, 1998

[54] METHOD FOR DETERMINING PRESSURE

[76] Inventors: Michael Edward Benne, 7 Woodleaf Ct., St. Paul, Mo. 63366; John Francis Donovan, 2242 Flordawn #4, Florissant, Mo. 63031; Christopher Allen Kelble, 2217 Colony Meadows Ct., Maryland Heights, Mo. 63043; Thomas Allen Kihlken, 13232 Tandem, St. Louis, Mo. 63146; Martin Jesse Morris, 309 Alexander Dr., Edwardsville, Ill. 62025; Alexander Pal, 12 Matterhorn Dr., Glen Carbon, Ill. 62034

[21] Appl. No.: 631,083
[22] Filed: Apr. 12, 1996
[51] Int. Cl.$^6$ ............................................. G01N 9/00
[52] U.S. Cl. ................................. 364/558; 73/147
[58] Field of Search ................. 364/558; 73/147, 73/700

[56] References Cited

U.S. PATENT DOCUMENTS

| 5,341,676 | 8/1994 | Gouterman et al. | 73/147 |
| 5,359,887 | 11/1994 | Schwab et al. | 73/147 |
| 5,612,492 | 3/1997 | Schwab et al. | 73/147 |

OTHER PUBLICATIONS

Morris, "Use of Pressure-Sensitive Paints in Low-Speed Flows", 1995.
Borovoy et al., "Pressure Sensitive Paint Application in Shock Wind Tunnel", 1995.
Engler, "Further Developments of Pressure Sensitive Paint (OPMS) For Non Flat Models in Steady Transonic flow and Unsteady Conditions", 1995.
Burns et al., "The Use of Pressure Sensitive Paints on Rotating Machinery", 1995.
LeSant et al., "An Image Resection Method Applied to Mapping Techniques", 1995.
Houck et al., "Pressure Sensitive Paint Flight Test", 1996.
Engler et al., "Aerodynamic Assessment of an Optical Pressure Measurement Systems (OpMS) by Comparison with Conventional Pressure Measurements in a high Speed Wind Tunnel", 1991.

*Primary Examiner*—James P. Trammell
*Assistant Examiner*—Patrick Assouad
*Attorney, Agent, or Firm*—Dale B. Halling

[57] ABSTRACT

A method of determining pressure requires that a three dimensional surface of an object (14) be covered with a pressure sensitive coating. Next a raw first image (74) is acquired while the object (14) is not under test and a raw second image (74) is acquired while the object is under test. The raw first image (74) and the raw second image (74) are adjusted for a dark image (76) to form an adjusted first image and an adjusted second image. The adjusted first image and the adjusted second image are mapped (78) from a two dimensional representation onto a three dimensional model, to form a first model and a second model. A ratio model is formed (80) by taking the ratio of the intensity of the first model and the second model. Finally, a pressure is determined (84) for every surface that forms the three dimensional model.

17 Claims, 5 Drawing Sheets

METHOD FOR DETERMINING PRESSURE

FIELD OF THE INVENTION

The present invention relates generally to the field of pressure measurements and more particularly to a method for determining pressure

BACKGROUND OF THE INVENTION

Most pressure measurement techniques determine the pressure at a point. This provides limited information in wind tunnel applications, where it is desirable to know the pressure at all points on the surface of a model. Pressure sensitive paints have been developed to overcome this limitation. The pressure sensitive paint is applied to the model and then exposed to an excitation light source. The pressure sensitive paint luminesces while being exposed to the light source. When pressure is applied to the pressure sensitive paint the intensity of the luminosity varies from point to point based on the amount of pressure applied at each point. The relationship between the luminance intensity and the pressure is that the intensity is inversely proportional to the applied pressure. To determine the actual quantitative pressure at any point it is necessary to determine the mathematical relationship between the intensity and the applied pressure. Present techniques take the ratio between an image with no pressure applied (reference image) and an image with the pressure applied (test image). This ratio of the intensities is then correlated to actual pressures. This method has a number of inaccuracies and inadequacies. For instance, prior art methods do not adjust for the variation in intensity of the paint that occurs due to variations in the surface temperature between the test image and the reference image. Prior art methods do not take into account the movement of the model between the reference and test image. Most importantly, prior art methods only give two dimensional pressure information for the three dimension model under test. This severely limits the usefulness of the information obtained.

Thus there exists a need for a method of determining pressure that overcomes these limitations and inaccuracies.

SUMMARY OF THE INVENTION

A method of determining pressure that overcomes these problems requires that a three dimensional surface of an object be covered with a pressure sensitive coating. Next a raw first image is acquired while the object is not under test and a raw second image is acquired while the object is under test. The raw first image and the raw second image are adjusted for a dark image to form an adjusted first image and an adjusted second image. The adjusted first image and the adjusted second image are mapped from a two dimensional representation onto a three dimensional model, to form a first model and a second model. A ratio model is formed by taking the ratio of the intensity of the first model and the second model. Finally, a pressure is determined for every surface that forms the three dimensional model.

DETAILED DESCRIPTION OF THE DRAWINGS

Figure 1:
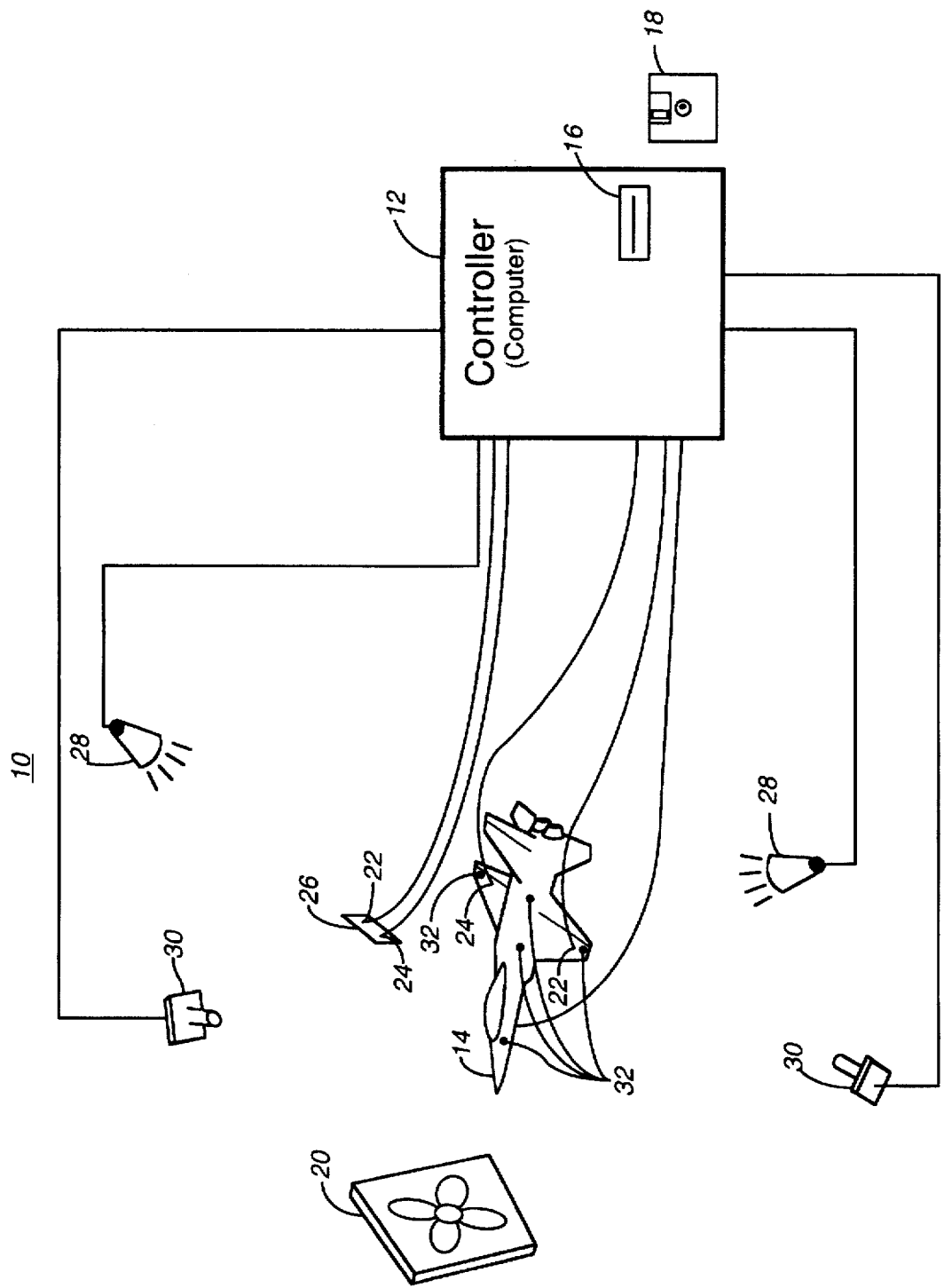
FIG. 1 is a block diagram of a system for determining pressure.

A system 10 for determining the full field pressure of a model is shown in FIG. 1. The system 10 includes a computer (controller) 12 that can be programmed to perform the steps necessary to determine the pressure on a model. The computer 12 has a disk drive 16 for receiving a computer-readable storage medium (computer disk) 18 that contains computer-readable instructions used in implementing the method of determining pressure described herein.

The system 10 is shown as it would be implemented in a wind tunnel. The wind is created by a fan 20 that blows on the model 14. The model 14 has a plurality of pressure taps (plurality of sensor points) 22 that send a signal to the computer indicative of the pressure (sensor pressure) at the tap. In one embodiment a plurality of temperature sensors 24 are collocated with the pressure taps 22. The temperature sensors 24 send a signal indicative of the surface temperature back to the computer 12. In one embodiment the system contains a coupon 26 that is used for calibration and has a pressure tap 22 and a temperature sensor 24. The model 14 and the coupon 26 are covered with a pressure sensitive coating. A plurality of excitation lights 28 are used to stimulate the coating to fluoresce. A plurality of cameras 30 capture the intensity of the luminescence from the model 14 and the coupon 26. A plurality of targets 32 located on the model 14 are used in locating the position of the cameras 30.

Figure 2:
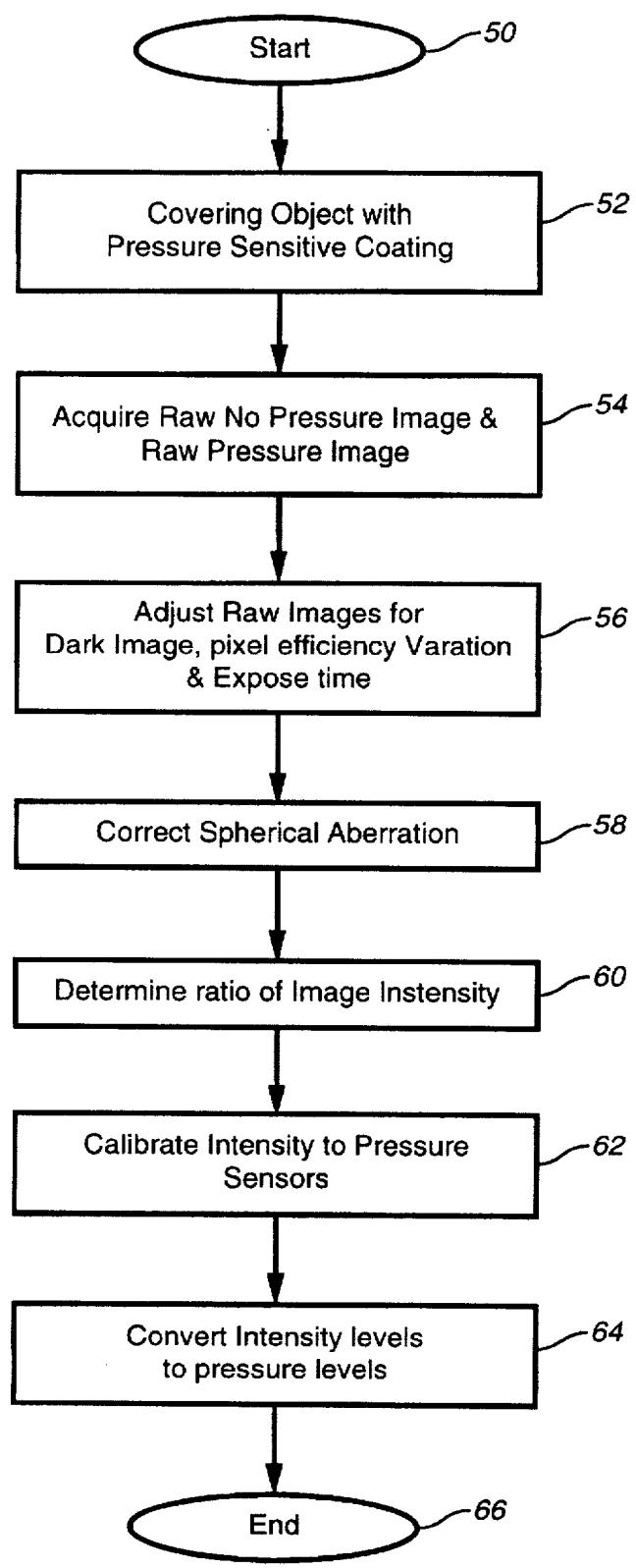
FIG. 2 is a flow chart of an embodiment of a method of determining pressure.

FIG. 2 is a flow diagram of a process used by the system of FIG. 1 to determine the pressure on a model. The process starts, step 50, by covering the object (model, three dimensional surface) with a pressure sensitive coating 52. Next, an image of the model is captured with the fan off (i.e., a raw no pressure image). Then an image of the model with the fan on is captured (raw pressure image) at step 54. The raw images are adjusted for the dark image, the variation in pixel efficiency and the exposure time of the camera, at step 56. This forms an adjusted no pressure image and an adjusted pressure image. The dark image is the image formed by an electronic camera with the shutter closed. This image represents a bias level at each pixel in the image. Electronic cameras have a plurality of pixels and each pixel measures the intensity of the light. Unfortunately, the efficiency of the pixel in converting the light to an electrical charge varies from one pixel to the next. Adjusting for this variation is necessary to make an accurate determination of the received intensity of light and therefor the pressure. In addition, variations in exposure time will result in variations in pixel charge levels. Adjusting for these variations is required to accurately determine the pressures on the model.

The spherical aberration is corrected at step 58. This forms a conditioned no pressure image and a condition pressure image. Spherical aberration results from the lens used to focus an image of the model in the camera. Spherical aberrations distort the image and therefor distort the picture of the pressures being applied to the model. A ratio of the intensities (ratio intensity) between the two images on a pixel by pixel basis is obtained at step 60 to form a ratio image. Step 62 involves calibrating the ratio intensities near (adjacent) the pressure taps to the pressures measured by the pressure taps. A polynomial curve is fitted to the known points and this forms a calibration curve. In one embodiment the input from the temperature sensors is also factored into the polynomial curve. In another embodiment the coupon is used take data points at a number of pressures (and temperatures). A polynomial curve is fitted through these points and the resulting curve relates pressure levels to intensity levels. When temperature is considered we end up with a surface that relates known intensity levels and temperature levels to pressure levels. In still another embodiment, the model's pressure taps (temperature sensors) are used to adjust the calibration curve determined using the coupon. Once the calibration curve (conversion scale) is determined, it is used to convert the known intensity levels to pressure levels for every pixel in the image at step 64. This ends the process at step 66.

Figure 3:
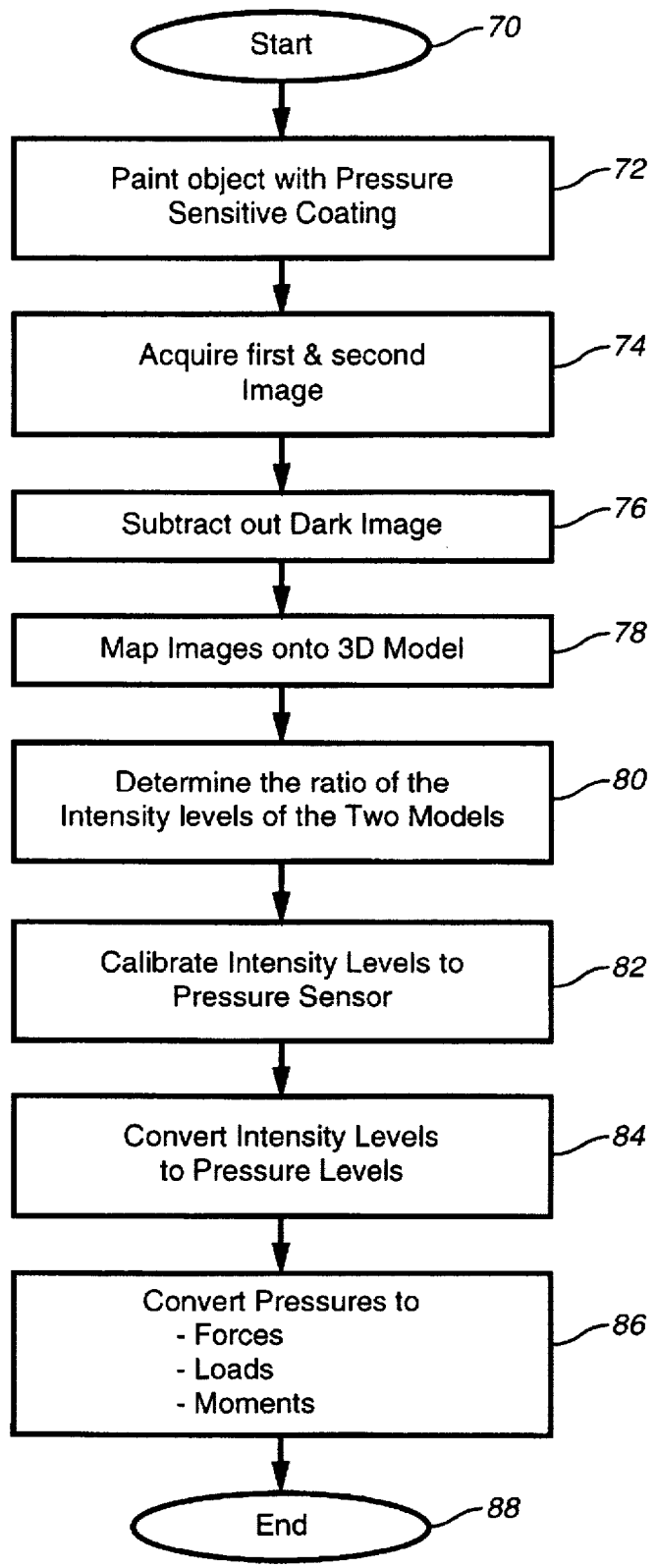
FIG. 3 is a flow chart of an embodiment of a method of determining pressure.

FIG. 3 is another embodiment of the process of determining pressure. The process starts, step 70, by painting the object with a pressure sensitive coating at step 72. Next a raw first image and a raw second image are acquired at step 74. The raw first image corresponds to an image acquired while the object is not under test. The raw second image corresponds to an image acquired while the object is under test. In step 76, the dark image is subtracted from the images to form an adjusted first image and an adjusted second image. The images (two dimensional surface) are then mapped onto a three dimension model (computer model) at step 78. This forms a first model and a second model. This requires knowing the relationship between the model and the cameras. Since the model often moves when the wind is applied, the camera positions have to be calculated from the images. A plurality of targets are used to determine the position of the camera. The targets are accurately located by determining the centroid of each target in an image. Once the position of the camera is known, the image data can be mapped onto the three dimensional model.

The three dimensional model is a standard computational fluid dynamics model and is composed of a plurality of flat surfaces. The ratio of the intensity levels for the two models is determined for every surface of the three dimensional model at step 80 to form a ratio model. At step 82 the pressure levels are calibrated to the intensity levels using one of the three methods mentioned with respect to FIG. 2. The intensity levels are converted to pressure levels for each of the plurality of surfaces on the three dimensional model at step 84. Because the two dimensional images are mapped onto a three dimension model, it is possible to integrate the pressure levels over each of the plurality of surfaces to determine a plurality of surface forces at step 86. These forces can be added together to determine a load on a part of the model at step 86. For instance, it is possible to determine the load on a wing of an aircraft model. Using these loads (or forces) it is possible to determine the moment about a point, at step 86. For instance, the moment of the wing about the point where the wing attaches to the body of the airplane can be calculated. This ends the process at step 88.

Figure 4:
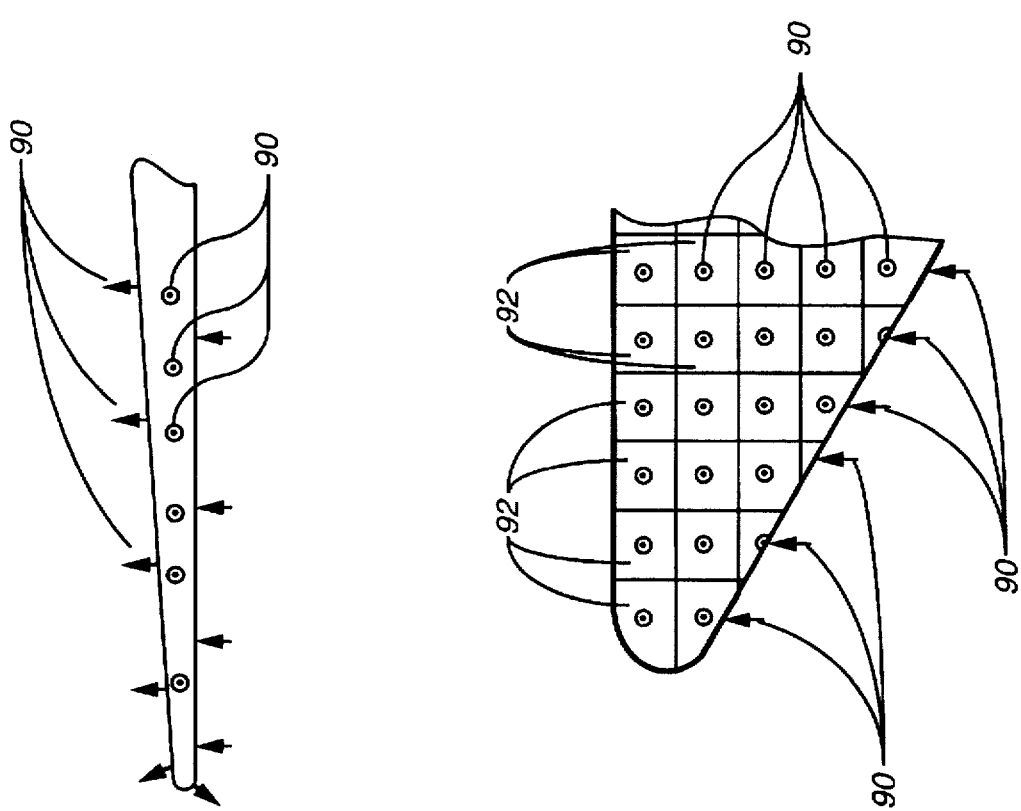
FIG. 4 is a schematic diagram of the pressures on the surfaces that form a part of three dimensional model.

FIG. 4 shows the forces 90 as vectors for each of the surfaces 92 forming the three dimensional model. These forces can be summed to determine loads on various parts of the model. In addition, the loads can be used to determine the moment about a point.

Figure 5:
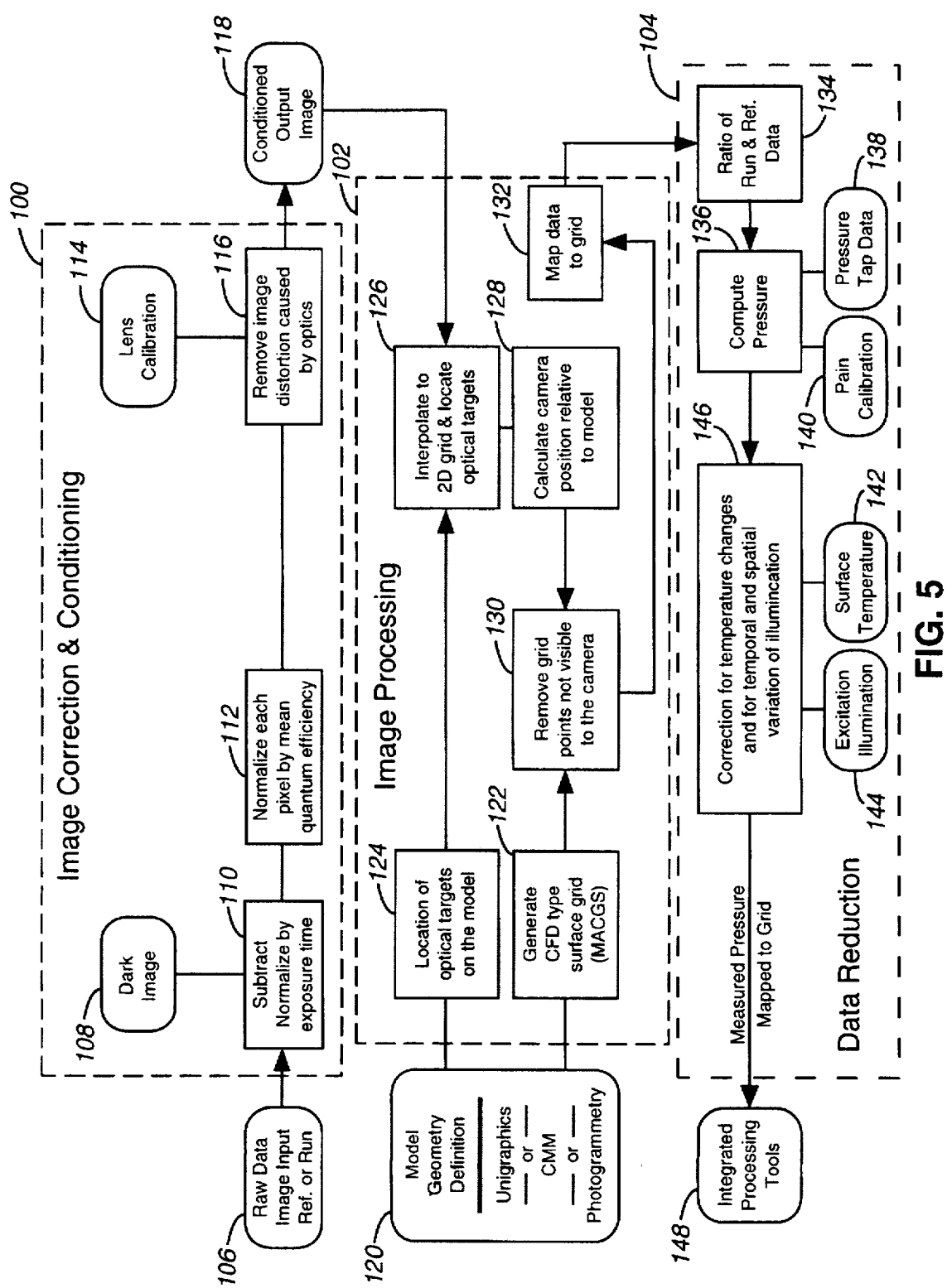
FIG. 5 is a flow chart of an embodiment of a method of determining pressure.

FIG. 5 is a more detailed flow chart of an embodiment of a process for determining pressure. The process is roughly broken into three parts. The first part is image correction and conditioning 100. The second part is image processing 102 and the third part is data reduction 104. The process starts by acquiring a reference and a run image of the model, at step 106. A dark image 108 is subtracted from the images and the images are corrected for camera exposure times at step 110. The images are then adjusted for the variations in the pixel efficiencies at step 112. A previously stored lens calibration 114 is used to eliminate the distortion of the image due to the optics at step 116. The output of the first part 100 is a pair of conditioned output images 118.

A three dimension computer model 120 of the object is used to generate a computation fluid dynamics model at step 122. In addition, the locations of the targets are located on the three dimensional model at step 124. The centroids of the targets in the images are used to align the three dimensional model with the conditioned output images, at step 126. The position of the cameras relative to the model is determined at step 128. Surfaces that were not visible to the camera are removed at step 130. The data (intensity levels) are mapped to the surfaces of the three dimensional model at step 132 for each image.

In part three 104 of the process, a ratio of the intensity levels is determined for the three dimensional run and reference images, at step 134. The intensity levels of the ratio three dimensional model are converted to pressure levels at step 136 by applying a calibration curve. The calibration curve can be determined by either using pressure tap data 138 or a paint calibration from a coupon 140 or by a combination of both. The ratio image is then corrected for surface temperature effects 142 and variations in the excitation illumination 144 at different points of the model, at step 146. The intensity of the paint varies with the temperature paint and this is corrected for at step 146. Because the excitation lights cannot uniformly illuminate every point of the model the intensity of the luminescence will vary for this reason alone. This variation needs to be taken into account to determine accurate pressures for every surface of the model. One embodiment corrects for this variation by placing a filter in front of the camera when acquiring the images. The filter is used to equalize the effects of the non-uniform illumination. The output of stage three 148 is the processed model including the pressures for every surface of the processed model. The processed model is then used to determine loads and moments for the model.

Using the process described herein the pressure across the model is accurately adjusted for the distortion of the camera lens and the non-uniformity of the pixels in a CCD or other electronic detection means. The process converts the two dimensional pressure representation to a three dimensional model. This allows the structural engineers to determine the ultimate parameters they are really interested in. Such as the loads on various parts of the model and the moments exerted about various points of the model.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of determining pressure, comprising the steps of:

(a) covering a three dimensional surface with a pressure sensitive coating;

(b) acquiring a raw no pressure image and a raw pressure image of the three dimensional surface;

(c) adjusting the raw no pressure image and the raw pressure image for a dark image, a variation in pixel efficiency and an exposure time to form an adjusted no pressure image and an adjusted pressure image;

(d) correcting the adjusted no pressure image and the adjusted pressure image for a spherical aberration, to form a conditioned no pressure image and a conditioned pressure image;

(e) determining a location of a plurality of targets for the conditioned no pressure image and the conditioned pressure image;

(f) mapping the conditioned no pressure image and the conditioned pressure image from a two dimensional surface to a three dimensional model of the three dimensional surface, to form a three dimensional no pressure model and a three dimensional pressure model;

(g) determining a ratio intensity for each of a plurality of surfaces forming the three dimensional model from the three dimensional no pressure model and the three dimensional pressure model to form a ratio image; and (h) determining a pressure for each of the plurality of surfaces in the ratio image.

2. The method of claim 1, wherein step (h) involves the steps of:

(h1) comparing a sensor pressure at a plurality of sensor points to the ratio intensity adjacent to the plurality of sensor points, to form a conversion scale;

(h2) applying the conversion scale to determine the pressure for each of the plurality of surfaces in the ratio image.

3. The method of claim 1, wherein step (h) involves the steps of:

(h1) using a coupon to form a calibration curve relating pressure to luminance intensity of the pressure sensitive coating;

(h2) applying the calibration curve to determine the pressure for each of the plurality of surfaces in the ratio image.

4. The method of claim 1, wherein the step of determining the location of the plurality of targets involves determining a centroid for each of the plurality of targets.

5. A method of determining pressure, comprising the steps of:

(a) covering a three dimensional surface of an object with a pressure sensitive coating;

(b) acquiring a raw first image when the object is not under test and a raw second image when the object is under test;

(c) adjusting the raw first image and the raw second image for a dark image to form an adjusted first image and an adjusted second image;

(d) determining a centroid for a plurality of targets on the object;

(e) mapping the adjusted first image and the adjusted second image from a two dimensional representation onto a three dimensional model, to form a first model and a second model;

(f) determining a ratio intensity of the first model and the second model, to form a ratio model;

(g) determining a pressure for each of a plurality of surfaces that form the three dimensional model.

6. The method of claim 5, wherein step (g) involves the steps of:

(g1) comparing a sensor pressure at a plurality of sensor points the ratio intensity adjacent to the plurality of sensor points, to form a conversion scale;

(g2) applying the conversion scale to determine the pressure for each of the plurality of surfaces in the ratio image.

7. The method of claim 5, wherein step (g) involves the steps of:

(g1) using a coupon to form a calibration curve relating pressure to luminance intensity of the pressure sensitive coating;

(g2) applying the calibration curve to determine the pressure for each of the plurality of surfaces in the ratio image.

8. The method of claim 5, further including the step of:

(h) determining a force at each of the plurality of surfaces using the pressure for each of the plurality of surfaces, to form a plurality of surface forces.

9. The method of claim 8, further including the step of:

(i) determining a load on a part of the three dimensional model using the plurality of surface forces.

10. The method of claim 9, further including the step of:

(j) determining a moment about a point using the load on the part.

11. The method of claim 5, wherein step (c) includes the step of:

(c1) adjusting the raw first image and the raw second image for a variation in pixel efficiency.

12. The method of claim 5, wherein step (c) includes the step (c1) adjusting the raw first image and the raw second image for an exposure time.

13. The method of claim 5, wherein step (c) includes the step (c1) correcting the raw first image and the raw second image for a spherical aberration in a lens used to acquire the raw first image and the raw second image.

14. A computer readable storage medium containing computer readable instructions that when inserted into a computer performs the following steps:

(a) acquires a raw first image when an object is not under test and a raw second image when the object is under test;

(b) adjusts the raw first image and the raw second image for a dark image to form an adjusted first image and an adjusted second image;

(c) determines a centroid for a plurality of targets on the object;

(d) maps the adjusted first image and the adjusted second image from a two dimensional representation onto a three dimensional model, to form a first model and a second model;

(e) determines a ratio intensity of the first model and the second model, to form a ratio model; and (f) determines a pressure for each of a plurality of surfaces that form the three dimensional model.

15. The computer readable storage medium of claim 14, further performs the step of:

(g) determining a force at each of the plurality of surfaces, to form a plurality of surface forces.

16. The computer readable storage medium of claim 15, further performs the step of:

(h) determining a load on a part of the three dimensional model using the plurality of surface forces.

17. The computer readable storage medium of claim 16, further performs the step of:

(i) determining a moment about a point using the load on the part.

* * * * *

UNITED STATES PATENT AND TRADEMARK OFFICE
CERTIFICATE OF CORRECTION

PATENT NO. : 5,731,995
DATED : March 24, 1998
INVENTOR(S) : Michael E. Benne, et al.

It is certified that error appears in the above-indentified patent and that said Letters Patent is hereby corrected as shown below:

On the title page, item [73] insert Assignee:

McDonnell Douglas

Signed and Sealed this

Twenty-eighth Day of December, 1999

Attest:

Q. TODD DICKINSON

*Attesting Officer*     Acting Commissioner of Patents and Trademarks